(12) United States Patent
Serey et al.

(10) Patent No.: US 8,491,740 B2
(45) Date of Patent: Jul. 23, 2013

(54) METHOD OF CONNECTING A COMPOSITE MATERIAL STRUCTURAL ELEMENT TO A TUBE

(75) Inventors: Jean-Pierre Serey, Paris (FR); Patrick Dunleavy, Palaiseau (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 0 days.

(21) Appl. No.: 13/141,837

(22) PCT Filed: Dec. 18, 2009

(86) PCT No.: PCT/FR2009/001453
§ 371 (c)(1),
(2), (4) Date: Sep. 9, 2011

(87) PCT Pub. No.: WO2010/072916
PCT Pub. Date: Jul. 1, 2010

(65) Prior Publication Data
US 2011/0308702 A1    Dec. 22, 2011

(30) Foreign Application Priority Data
Dec. 24, 2008   (FR) ..................................... 08 07448

(51) Int. Cl.
*A63B 49/10* (2006.01)

(52) U.S. Cl.
USPC ............ 156/93; 156/152; 156/148; 156/196; 156/250; 156/256; 156/264; 156/266; 156/212; 156/217; 156/218; 74/579 R; 74/581

(58) Field of Classification Search
USPC ................... 156/93, 152, 148, 196, 250, 256, 156/264, 266, 212, 217, 218; 74/579 R, 581
See application file for complete search history.

(56) References Cited

U.S. PATENT DOCUMENTS

| 2,132,780 | A | * | 10/1938 | Davis | 473/547 |
|---|---|---|---|---|---|
| 2,878,020 | A | * | 3/1959 | Robinson | 473/535 |
| 3,993,308 | A | * | 11/1976 | Jenks | 473/535 |
| 5,024,874 | A | | 6/1991 | Yasui et al. | |
| 5,783,279 | A | * | 7/1998 | Edgson et al. | 428/116 |
| 2006/0121809 | A1 | | 6/2006 | Goering | |
| 2007/0007386 | A1 | | 1/2007 | Coupe et al. | |

FOREIGN PATENT DOCUMENTS

| DE | 39 29 284 A1 | 4/1991 |
|---|---|---|
| DE | 10 2004 054 345 A1 | 5/2006 |
| EP | 1 736 674 A1 | 12/2006 |
| JP | 2010196176 A * | 9/2010 |
| WO | 2007/061586 A1 | 5/2007 |

* cited by examiner

*Primary Examiner* — Jeff Aftergut
*Assistant Examiner* — Jaeyun Lee
(74) *Attorney, Agent, or Firm* — Sughrue Mion, PLLC

(57) ABSTRACT

The invention relates to a method of fabricating a structural part comprising a tubular portion from which there projects a structural element made of composite material, the method comprising the steps of:
  shaping a plane preform comprising a stack of a plurality of superposed fiber plies such that over at least a fraction of the preform that is to form a structural portion, the plies are secured to one another, and over at least another fraction of the preform that is to form a portion for connecting to the tube, the plies are separable so as to form two facing sheets;
  inserting a tube between the sheets of the connection portion so that the sheets surround the tube at least in part; and
  bonding the tube to the preform such that the tube forms the tubular portion and the preform forms the structural element of the structural part.

6 Claims, 3 Drawing Sheets

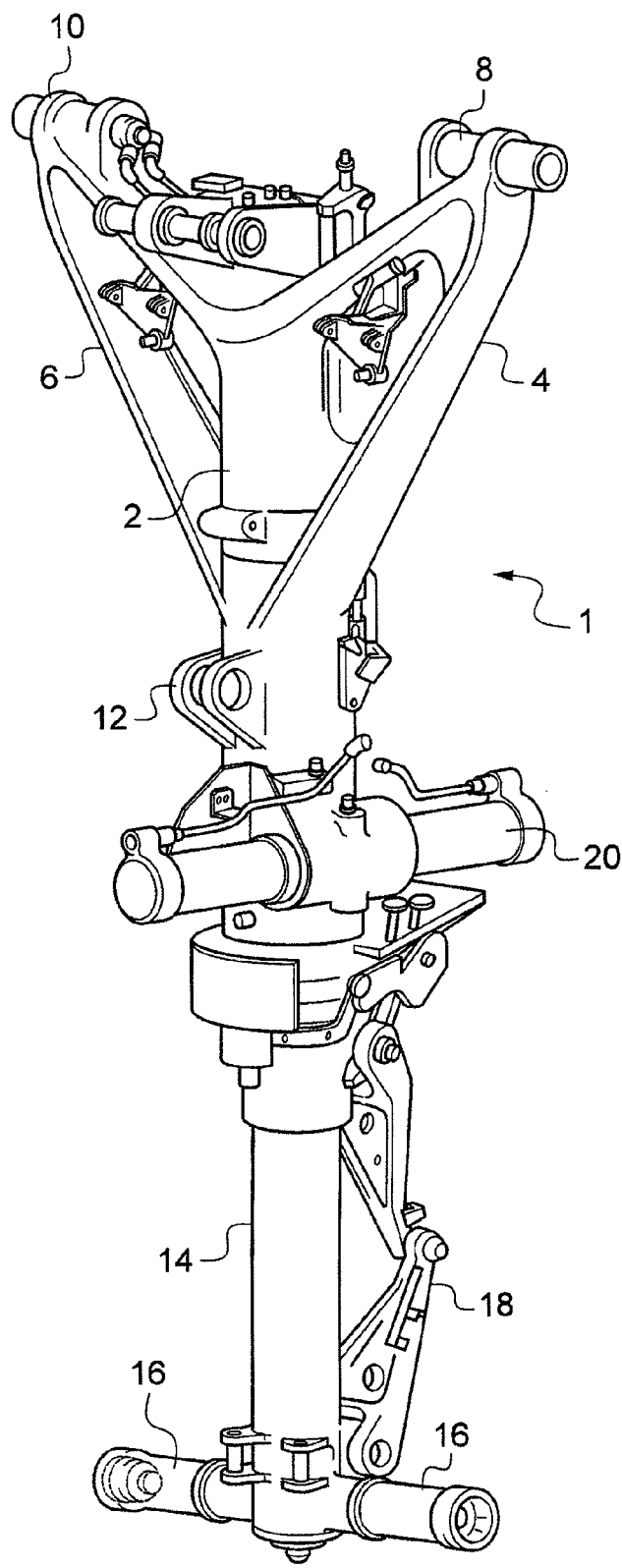
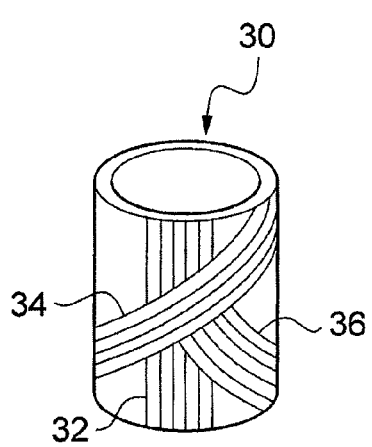
Fig.1
PRIOR ART
Fig.2

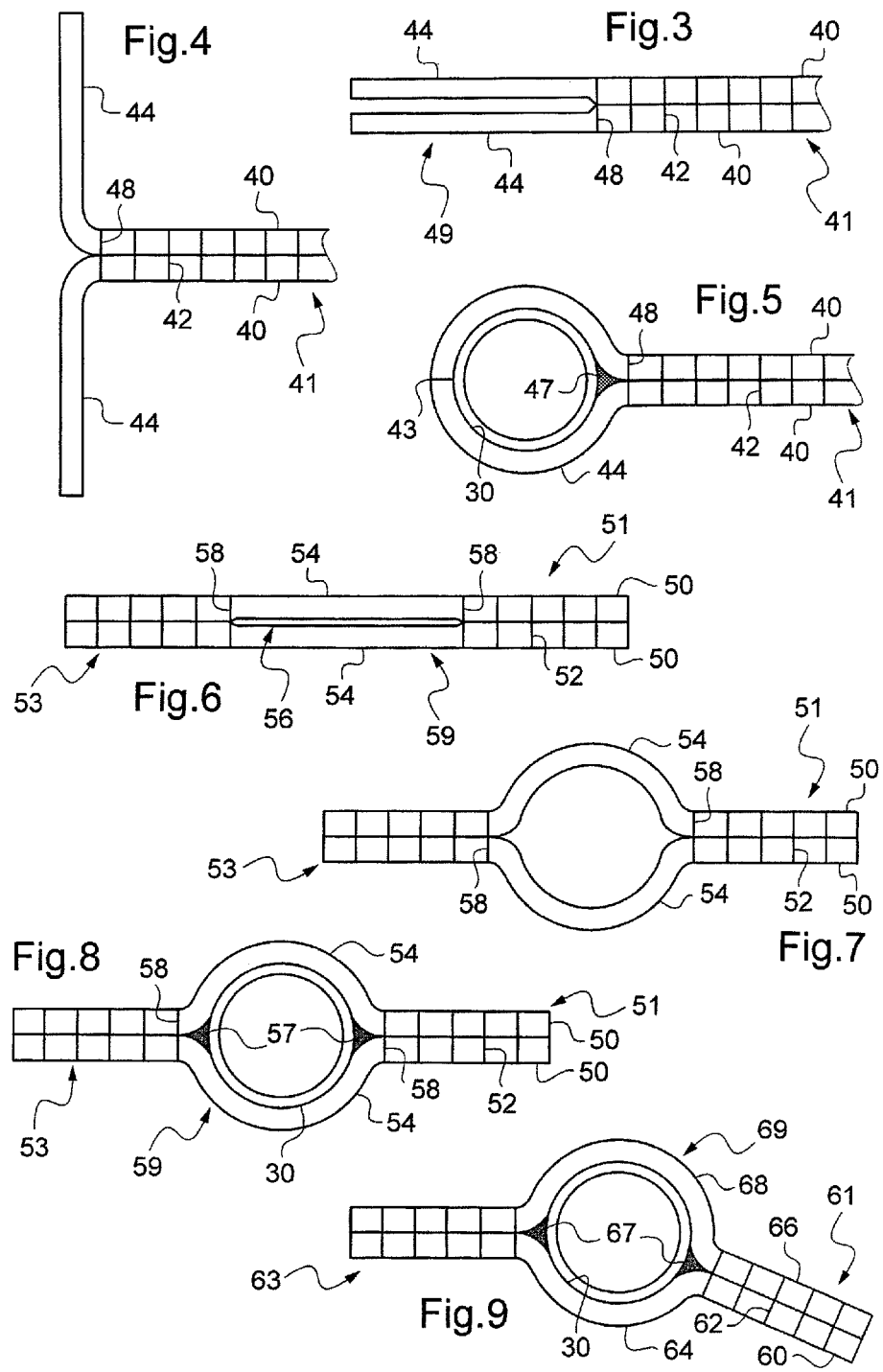

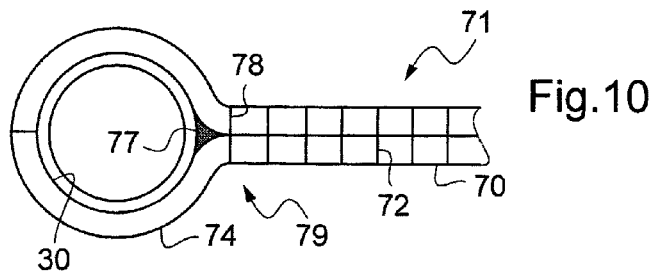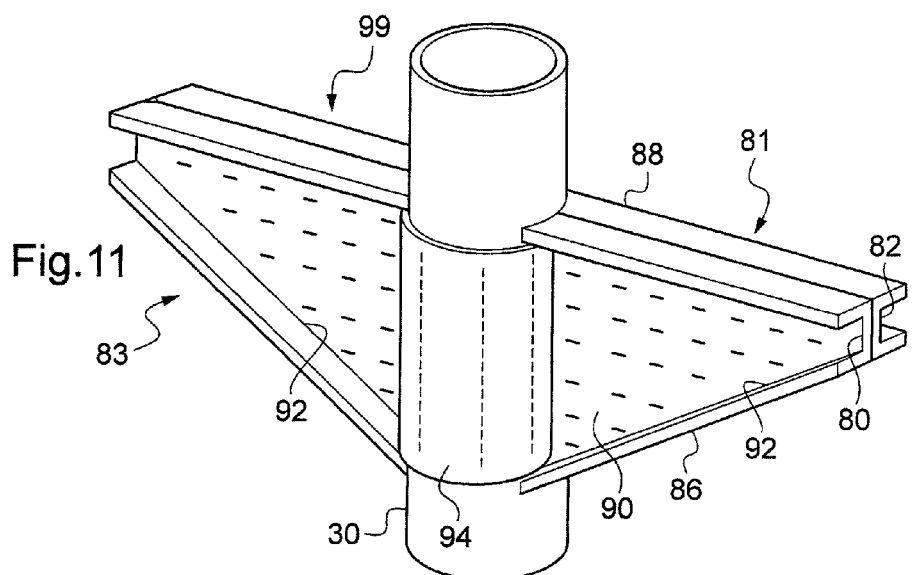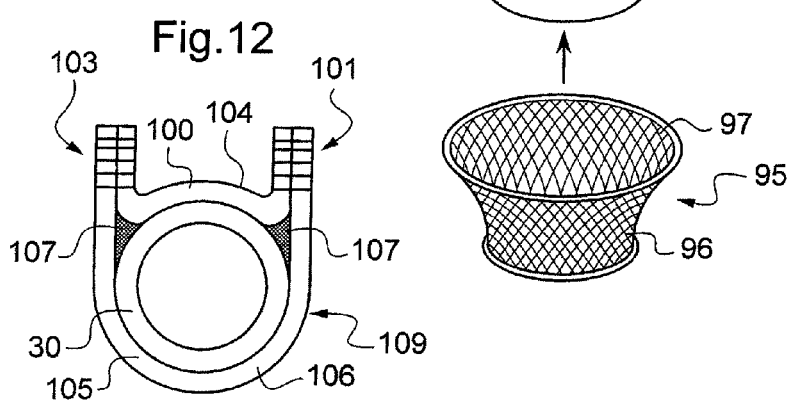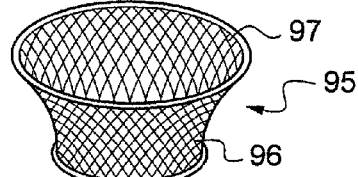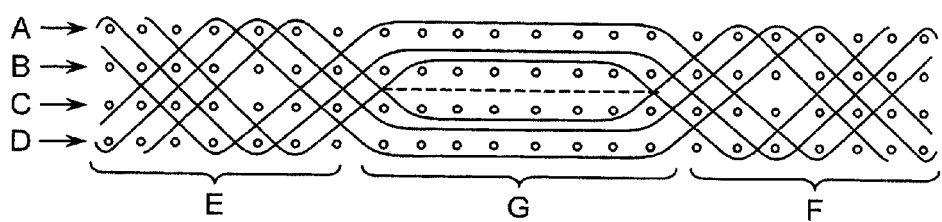

METHOD OF CONNECTING A COMPOSITE MATERIAL STRUCTURAL ELEMENT TO A TUBE

CROSS REFERENCE TO RELATED APPLICATIONS

This application is a National Stage of International Application No. PCT/FR2009/001453 filed Dec. 18, 2009, claiming priority based on French Patent Application No. 08 07448, filed Dec. 24, 2008, the contents of all of which are incorporated herein by reference in their entirety.

The present invention relates to a method of fabricating a structural part comprising a structural element that is made of composite material and that is connected to a tube, in particular for use in aviation.

BACKGROUND OF THE INVENTION

Aircraft include landing gear in which a main structural part, referred to as a "strut", is generally pivotally mounted to the aircraft to enable the landing gear to be retracted into a housing within the aircraft after takeoff. The strut comprises a tube having a rod slidably mounted therein, which rod carries the wheel(s) at its bottom end. The strut also includes structural elements such as arms or webs for Connecting the tube to the aircraft. In particular, certain struts include side arms that extend on either side of the tube and that are terminated by spools for receiving pins for hinging the strut to the aircraft.

A strut of that type is generally made of metal, e.g. of aluminum or of steel, in particular as a casting or as a forging. It is then easy to provide connection shapes between the tube and the arms in order to ensure that the connections between these elements are mechanically strong.

It is also known to make tubes out of composite material by filamentary winding of fibers onto a mandrel. That method of fabrication is easily industrializable and makes it possible to control the orientation and the distribution of the fibers so as to make a tube that is light in weight while also being mechanically strong.

The invention seeks to provide a method of fitting said tube with structural elements, e.g. lateral arms or beams for transmitting forces.

Proposals have been made to use reinforcing parts that are adhesively bonded, being fitted astride the structural element and the tube. However that type of connection is not satisfactory. The fibers of the structural element terminate in register with the tube and no continuity is provided. In order to make that connection mechanically strong, it is necessary to use reinforcing parts that are thick and of large area. The assembly then becomes heavier and more difficult to make, and the connection becomes bulkier.

OBJECT OF THE INVENTION

A particular object of the invention is to avoid the drawbacks of the prior art, and to propose a method for use with composite material elements that is effective and inexpensive for bonding structural elements to a tube. The method makes it possible in particular to make struts for aircraft landing gear.

BRIEF DESCRIPTION OF THE INVENTION

To this end, the invention provides a method of fabricating a structural part comprising a tubular portion from which there projects a structural element made of composite material, the method comprising the steps of:
shaping a plane preform comprising a stack of a plurality of superposed fiber plies such that over at least a fraction of the preform that is to form a structural portion, the plies are secured to one another, and over at least another fraction of the preform that is to form a portion for connecting to the tube, the plies are separable so as to form two facing sheets;
inserting a tube between the sheets of the connection portion so that the sheets surround the tube at least in part; and
bonding the tube to the preform such that the tube forms the tubular portion and the preform forms the structural element of the structural part.

The fibers of the preform present continuity between the structural portion proper, e.g. forming an arm, and the portion for connection to the tube. The fibers of the preform thus fit around the tube over a large connection area, thus enabling stresses to be spread over large areas and enabling forces to be transferred from the structural element of the tube with excellent continuity.

The preform may be obtained in various ways:
it is possible to start from a three-dimensional (3D) or a two-and-a-half-dimensional (2.5D) fabric made up of a plurality of superposed plies, and then in the connection portion to unlink the plies so as to enable them to be separated in two sheets;
it is also possible to start from two blanks cut out from a fabric made up of a plurality of superposed plies, the two blanks being superposed and stitched together in the structural portions, and being left free in the connection portion, with each of the blanks then forming a respective one of the sheets; and
it is also possible to use a 2.5D fabric woven in such a manner that the plies are intimately linked together in the structural portions while being left free in the connection portion, so that the plies can be separated to form two sheets.

BRIEF DESCRIPTION OF THE DRAWINGS

The invention can be better understood on reading the following description given by way of example with reference to the accompanying drawings, in which:

FIG. 1 is a perspective view of a prior art aircraft undercarriage with a metal strut;

FIG. 2 is a perspective view of a composite material tube during fabrication;

FIGS. 3 to 5 are views of a structural element preform and of its assembly with a tube in a first implementation of the invention, the structural element being seen edge-on;

FIGS. 6 to 8 are views showing an assembly in a second implementation of the invention;

FIG. 9 shows a variant of FIG. 8;

FIG. 10 is a view showing an assembly in a third implementation of the invention;

FIG. 11 is a view of a strut of composite material made using the method of the invention as shown in FIGS. 6 to 8;

FIG. 12 is a view showing an assembly in a fourth implementation of the invention; and FIG. 13 is a diagrammatic section view of a 2.5D fabric adapted to implementing the method of the invention.

DETAILED DESCRIPTION OF THE INVENTION

The invention is described below in application to the field of aviation, and in particular the field of landing gear. Naturally, the invention is not limited to this type of application.

FIG. 1 shows an aircraft nosewheel undercarriage comprising a strut 1 made of aluminum alloy that comprises a cylindrical portion 2 with two side arms 4, 6 terminating at the top in spools 8, 9 that receive hinge pins for connecting the strut to the aircraft. The strut 1 also includes a fastener member 12, here in the form of two lugs forming a fork for receiving a strut (not shown) for stabilizing the undercarriage in the extended position.

A rod 14 is mounted to slide vertically in the cylindrical portion 2 of the strut 1. The bottom portion of the rod 14 carries axles 16 that receive wheels. The rod 14 is connected by a torque linkage 18 to a steering member 20 fastened to the strut 1, here comprising hydraulic actuators for turning the rod, thereby enabling the wheels to be swiveled in order to steer the airplane while taxiing.

The invention seeks in particular to enable a strut to be made of composite material, the strut comprising a tubular element and a structural element such as an arm or a beam.

A tube of composite material is made initially. In this respect, FIG. 2 shows a tube 30 made by filamentary winding of fibers on a mandrel, e.g. for laying successive layers of fibers 32 along a longitudinal axis followed by layers of crossed fibers 34, 36, the method enabling the distribution of the various fibers to be adjusted. During winding, the fibers are impregnated with a resin that is subsequently polymerized. By controlling the composition and the orientation of the fibers, this method makes it possible to obtain a tube that is light in weight, while presenting strong mechanical characteristics. This method is well known. In a variant, the tube may be obtained by other methods, e.g. by braiding.

Thereafter, the structural element is made and subsequently assembled to the tube 30. For this purpose, a preform is prepared initially.

In a first implementation of the invention, as shown in FIGS. 3 to 5, the preform 49 is made using two blanks cut from a fiber pad made by superposing plies that are connected together, e.g. by weaving or by stitching, or as to obtain good cohesion between the plies and allow the pads to be handled. By way of example, the fibers may be fibers of glass, aramid, or carbon. Nevertheless, the bonding between the superposed plies is preferably sufficiently loose to allow the plies to slide relative to one another while the blanks are being shaped.

Fabrication of the preform 49 begins by cutting blanks 40 out from a fiber pad. As can be seen in FIG. 3, the blanks 40 are subsequently superposed and bonded together, by stitching 42 in this example, while taking care to leave the ends of the blanks 40 free. A preform 49 is thus defined that has a structural portion 41 corresponding to the stitched fractions, which structural portion is to form the arm of the structural element, and a connection portion for connecting to the tube, corresponding to the free end fractions of the blanks 40, which form two facing sheets 44 that are separable.

As can be seen in FIG. 4, the sheets 44 are moved apart. Thereafter, in a following step shown in FIG. 5, the tube 30 is inserted between the sheets 44 so that the sheets 44 surround the tube and join together at a point 43 diametrically opposite from the beam 41. In a variant, the two ends 44 may be shorter and not joined together at the point 43, or they may be longer and overlie each other, depending on the strength that is to be given to the connection. The assembly as made in this way is then impregnated with resin, e.g. by a known transfer method such as injecting resin under pressure or infiltration under a vacuum. The resin is subsequently hardened by polymerization.

This forms a connection between the structural element and the tube 30 by providing fiber continuity from the structural element of the structural portion (the stitched fraction that is cantilevered out from the tube) to the connection portion (the non-stitched free fraction that surrounds the tube). The connection portion provides a large contact area, thereby making it possible for the connection between the structural element and the tube to be mechanically strong. Furthermore, implementation is simple. The size occupied by the connection is small, and both the weight and the cost of the assembly are therefore reduced.

Preferably, an insert 47 of substantially triangular shape, e.g. made of pultruded material, is inserted between the tube 30 and the structural element and serves to fill the space between the sheets in register with the stitching 48 that defines the boundary between the connection portion and the structural portion of the structural element 41.

FIGS. 6 to 8 show a second implementation of the invention that comprises making a structural element having two arms 51, 53 that are to extend on either side of the tube 30. Fabrication begins by preparing the preform 59. Two blanks 50 are initially cut out from a fiber pad. The blanks 50 are superposed and bonded together in end zones thereof by stitching 52, taking care to leave a central zone free in which the blanks 50 are not stitched together.

A structural element is thus defined that has structural portions 51, 53 that form the arms, corresponding to the stitched zones, and a connection portion that corresponds to the non-stitched zone in which the central fractions 54 form separable sheets. A slot or space 56 is thus defined between the facing sheets.

As shown in FIG. 7, the sheets 54 are then spaced apart to form a substantially circular central passage. In a following step shown in FIG. 8, the tube 30 is inserted between the sheets 54 such that the sheets surround the tube 30 completely. Inserts 57 are interposed between the sheets and the tube where the sheets start. The assembly as made in this way is then impregnated with resin that is hardened by polymerization.

This provides a connection between the tube 30 and the two arms 51, 53 that are cantilevered out from the tube, with the same advantages as in the above-described embodiments.

In a variant, in plan view, the two beams may form between them an angle as shown in FIG. 9. Under such circumstances, a preform 69 is prepared by cutting out two blanks 60, 66 having two non-stitched central fractions 64 and 68 forming sheets that are of different lengths, the sheet 64 formed by the blank 60 that is situated within the angle being shorter than the sheet 68 formed by the other blank 66. Inserts 67 are placed between the tube and the sheets, where the sheets start. The assembly is then polymerized.

When assembling the two blanks 60, 66 together, the ends of these blanks are superposed and stitched together so as to define two arms 61, 63, with the central fractions not being stitched together so as to be left free and form two sheets 64, 68. Thereafter, and in the same manner as described above, the sheets 64, 68 are spaced apart and the tube 30 is inserted between them. The assembly is impregnated with resin that is hardened by polymerization.

FIG. 10 shows a third implementation of the invention. The fabrication of the preform 79 begins by cutting out a single blank 70 of elongate shape from a fiber pad. The blank 70 is then folded in half so that its ends 72 are superposed and stitched together to form the structural portion 71. The central fraction 74 of the blank is left free to form two facing sheets that join together continuously. The tube 30 is then inserted in the central fraction 74 that completely surrounds the tube. The assembly as made in this way is impregnated with resin that is hardened by polymerization.

With the method of the invention, it is possible to give various shapes to the beams 41, 51, 53, 61, 71 depending on how the blanks constituting these beams are cut out and assembled together.

FIG. 11 shows an example of a strut made by the method of the invention. The structural portions in this example form webs. As described above, fabrication of the preform 99 begins by cutting out the blanks 80, 82 from a fiber pad. The blanks 80, 82 are then superposed and stitched together by stitching 90 so as to form the two arms 81, 83 while leaving a central connection zone free in which the blanks form separable sheets 94 between which the tube 30 is inserted (only one of the sheets is visible in the figure).

It should be observed that the stitched fractions of the blanks are not stitched together over their entire height. The edges are left free so as to enable them to be folded along the lines of stitching 92. The edges as folded out in this way form flanges 86, 88 that serve to stiffen the arms 81, 83, and in particular the webs constituted by the stitched fractions of the arms.

Reinforcement 95 in the form of a braided sleeve may be added, the reinforcement having a cylindrical portion 96 that fits over the tube 30 and a collar 97 that is pressed against the ends of the flanges 86 where they are close to the tube 30. Said ends are stitched to the collar 97.

The assembly as made in this way is impregnated with resin that is hardened by polmerization in order to form two stiffened webs 81 and 83 that are strongly connected to the tube 30.

Finally, another implementation of the invention is shown in FIG. 12.

The preform 109 is obtained from two blanks 100 and 106, the blank 106 being considerably longer than the blank 100. The ends of the blanks 100 and 106 are superposed and stitched together to form arms 101 and 103. The central fractions are left free to so as to form sheets 104 and 105 between which the tube 30 is inserted. The sheet 105 is considerably longer than the sheet 104. The arms 101 and 103 extend in parallel. They may for example serve as lugs for receiving the pin at the end of a stay. Inserts 107 are inserted between the tube and the sheets.

Thus, in all of the implementations shown, one or more blanks are cut out and two fractions are superposed, either belonging to the same blank or else to two distinct blanks, which fractions are then stitched together in part so as to define at least one structural portion in which the facing fractions are stitched together, and at least one connection portion in which the facing fractions are free. Thereafter, the tube is inserted between the fractions in the connection zone where the fractions have been left free so as to surround the tube, thus making it possible firstly to have fiber continuity between the structural portions that are cantilevered out from the tube and the connection portion that extends around the tube.

In the particular implementation shown in FIG. 10, only one blank is used, with the superposed fractions being joined together in the connection portion so that in said portion the facing fractions that have been left free form a ring.

In general, the stitching may be performed in various ways, in particular by using a tufting stitch, with the number of stitches being variable to achieve particular reinforcement of the connections.

The orientation of the reinforcing fibers constituting the blanks may be adapted to favor one particular direction as a function of the orientation of the stresses to which the beam is subjected, so as to improve mechanical strength in a method that is well known.

In order to improve the strength of the assembly, the structural element may advantageously be stitched to the tube prior to polymerization. Such stitching is shown in FIG. 11. It extends parallel to the axis of the tube and it connects the sheet to the tube.

In all of the examples shown, the structural element is obtained from a preform that is prepared using one or two blanks that are superposed and stitched together in a structural portion that is to form an arm, a lug, or a web that projects from the tube, while another portion is left free to form the sheets.

The preform could be made differently. In FIG. 13, there is shown in highly diagrammatic manner, a fabric comprising four superposed plies A, B, C, and D of fibers that are connected together by weft yarns that, in fractions E and F link the plies A, B, C, and D intimately together to form the structural portions of the preform, whereas in a fraction G they leave the plies free so that they can be separated into two sheets. The potential separation is represented by a dashed line between the two sheets.

It is also possible to start from a 3D or 2.5D fabric comprising a plurality of mutually superposed plies that are linked together by weft yarns, and to locally unlink the plies in order to make them mutually separable in the connection portion, so as to form the sheets.

The invention is not limited to the above description, but covers any variant coming within the ambit defined by the claims. In particular, although it is stated above that the tube is itself made of composite material, so as to enable it to be impregnated simultaneously with the structural element, it is possible to implement the invention using a tube that is not made of composite material, e.g. a metal tube. The resin then needs to be selected to favor strong adhesion between the structural element and the tube.

What is claimed is:

1. A method of fabricating a structural part comprising a tubular portion (30) from which there projects a structural element made of composite material, the method comprising the steps of:

shaping a preform (49; 59; 69; 79; 99) comprising a stack of a plurality of superposed plies such that over at least a fraction of the preform that is to form a structural portion, the plies are secured to one another, and over at least another fraction of the preform that is to form a portion for connecting to the tube, the plies are separable so as to form two facing sheets (44; 54; 64; 68; 74; 94);

inserting a tube (30) between the sheets of the connection portion so that the sheets surround the tube at least in part; and bonding the tube to the preform such that the tube forms the tubular portion and the preform forms the structural element of the structural part;

wherein the preform comprises two blanks cut out from a pad of superposed plies, the blanks being stitched together in at least one fraction to form the structural portion, and being left free in at least one other fraction to form the portion for connection to the tube, whereby in said portion each blank forms one of the sheets (44; 54; 64; 68; 94).

2. A method according to claim 1, wherein one of the blanks is longer than the other, the ends of the blanks being stitched together so as to leave two remaining sheets (64, 68; 104, 105), one of which is longer than the other.

3. A method according to claim 1, wherein the ends are not completely stitched together, edges (86, 88) being left free so as to be folded along a line of stitching (92) in order to form stiffeners for the structural portion.

4. A method according to claim 1, wherein an insert (47; 57; 67; 77) of substantially triangular section is placed between the tube and the sheets, where the sheets start.

5. A method of fabricating a structural part comprising a tubular portion from which there projects a structural element made of composite material, the method comprising the steps of:
- shaping a preform comprising a stack of a plurality of superposed plies such that over at least a fraction of the preform that is to form a structural portion, the plies are secured to one another, and over at least another fraction of the preform that is to form a portion for connecting to the tube, the plies are separable so as to form two facing sheets;
- inserting a tube, which is made of a composite material between the sheets of the connection portion so that the sheets surround the tube at least in part;
- bonding the tube to the preform such that the tube forms the tubular portion and the preform forms the structural element of the structural part, and after the tube has been inserted between the sheets, stitching the sheets to the tube prior to bonding.

6. A method according to claim 5, wherein an insert (47; 57; 67; 77) of substantially triangular section is placed between the tube and the sheets, where the sheets start.

* * * * *